Figure 1:
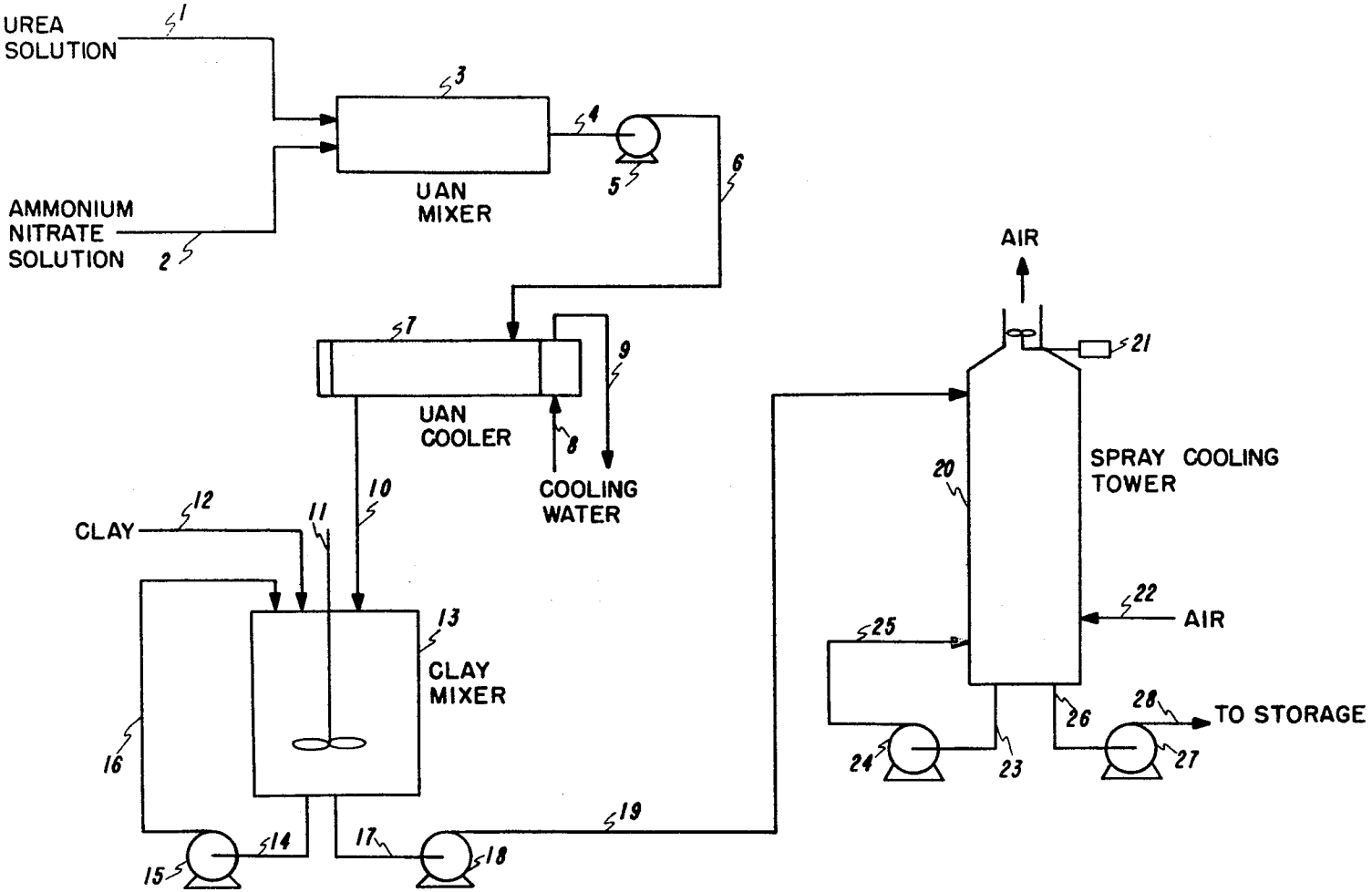
Figure 2:
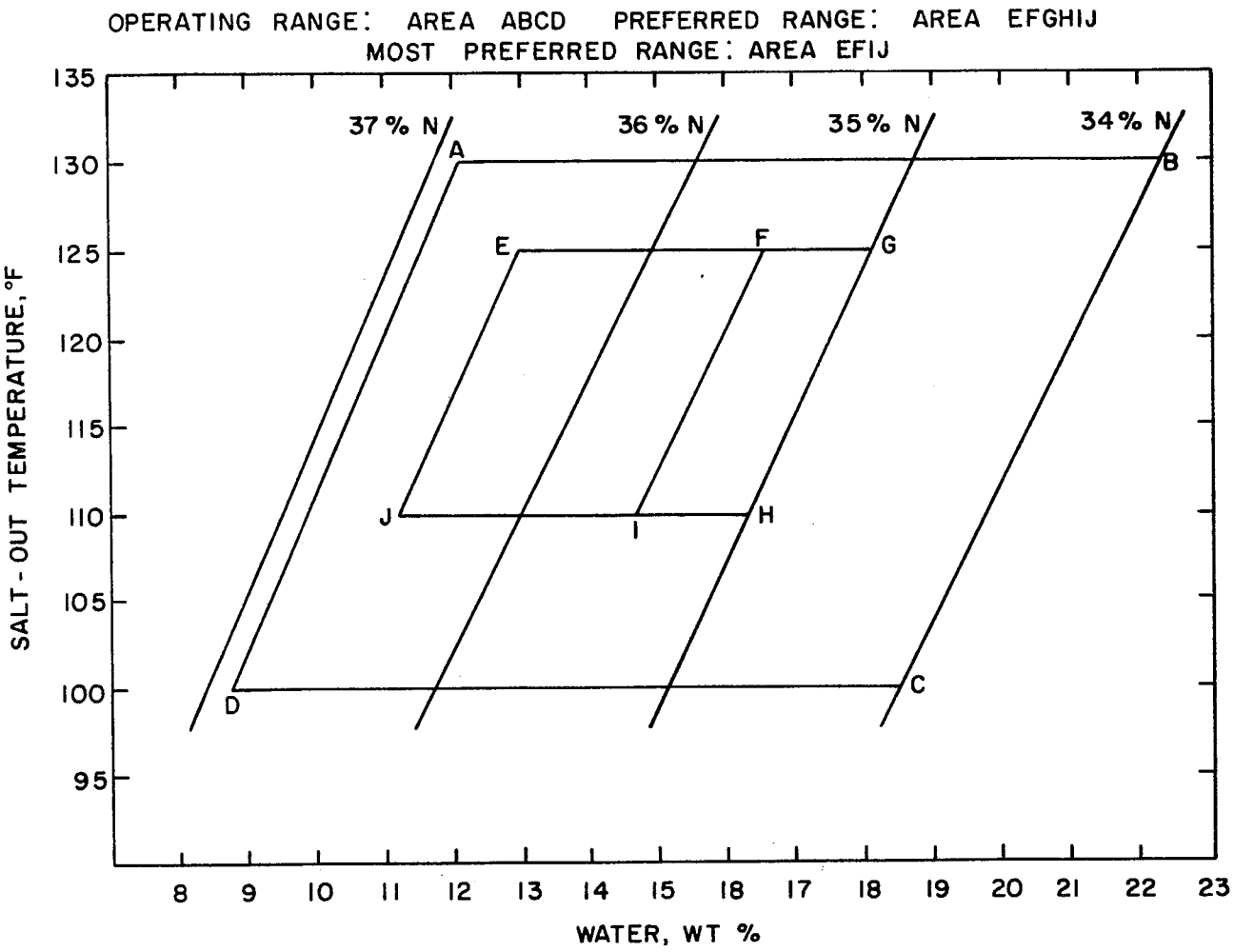
Figure 3:
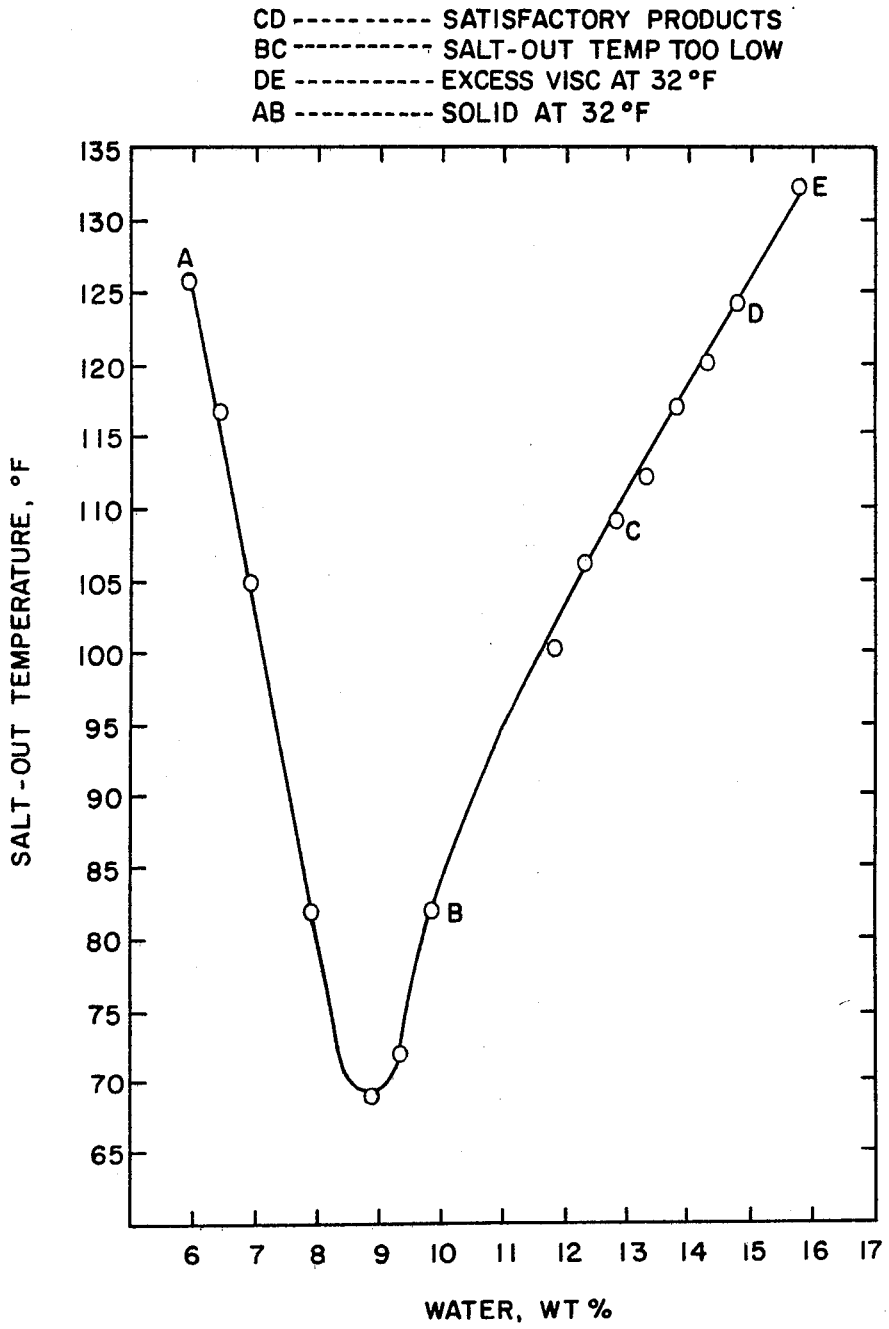
Figure 4:
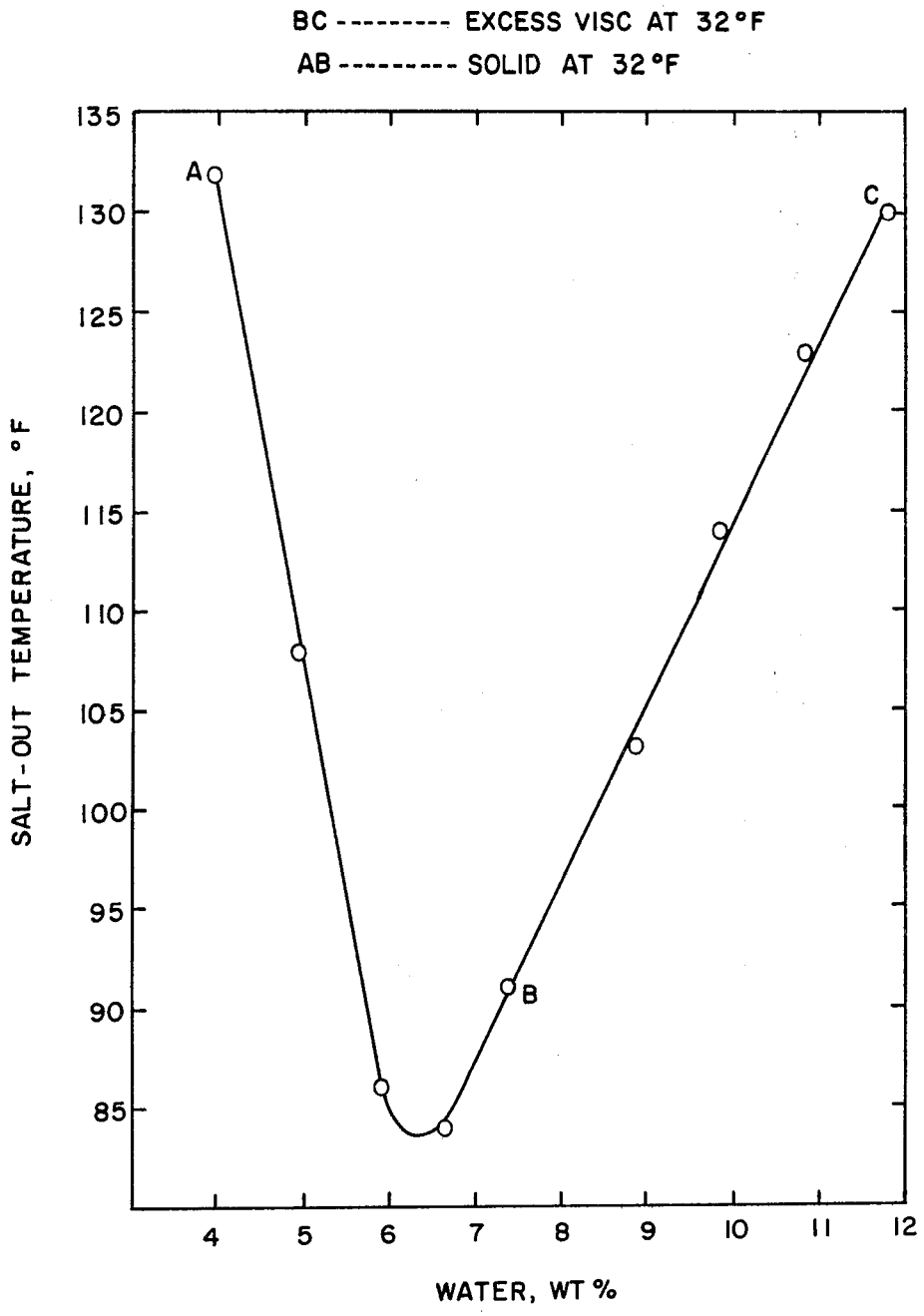
Figure 5:
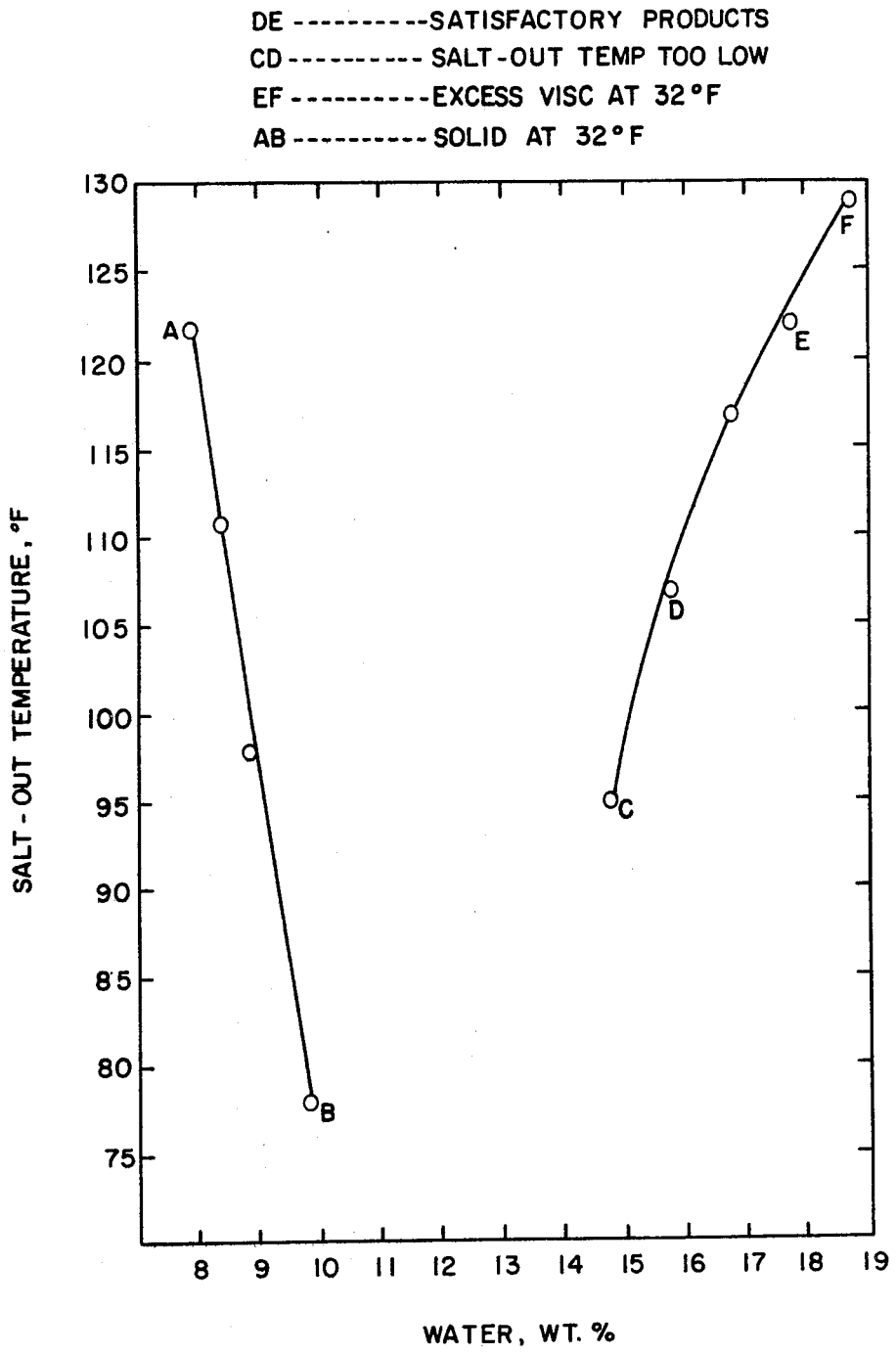

United States Defensive Publication [19] (H) [11] T104,101

Boles et al. [43] Apr. 3, 1984

[54] PRODUCTION OF UREA-AMMONIUM NITRATE SUSPENSION FERTILIZER

[76] Inventors: Jeffrey L. Boles, 3550 Helton Dr., A-3, Florence, Ala. 35630; Thomas M. Jones, 208 Stephenson Ct., Sheffield, Ala. 35660

[21] Appl. No.: 448,568

[22] Filed: Dec. 10, 1982

[51] Int. Cl.[3] ..... C05C 9/00

[52] U.S. Cl. ..... 71/30; 71/59; 71/64.08

[57] ABSTRACT

Highly concentrated nitrogen suspension fertilizers which have excellent long-term storage and handling properties in both warm and severely cold weather are produced from urea, ammonium nitrate, water, and attapulgite clay and contain urea crystals suspended in a saturated solution containing urea and ammonium nitrate. The compositions must be maintained within a very narrow range to produce suspensions satisfactory for commercial use. This narrow composition range is such that the saturation temperatures and nitrogen contents of the products fall within specific ranges. Deviation from these ranges results in poor quality, commercially unusable products. If the saturation temperature or nitrogen content is too high, the product is too viscous to be pumped or applied to the soil. If the saturation temperature is too low, the product contains excessively large crystals which settle to the bottom of storage and shipping tanks and clog spray nozzles in suspension application equipment. The process consists of first heating the urea, ammonium nitrate, and water to an all solution state or combining hot urea and ammonium nitrate solutions from production. Then the solution is cooled in two or more stages with gelling-type clay added prior to crystallization and air cooling used in the crystallization stage(s).

7 Claims, 5 Sheets Drawing,

29 Pages Specification

The file of this unexamined application may be inspected and copies thereof may be purchased (849 O.G. 1221, Apr. 9, 1968).

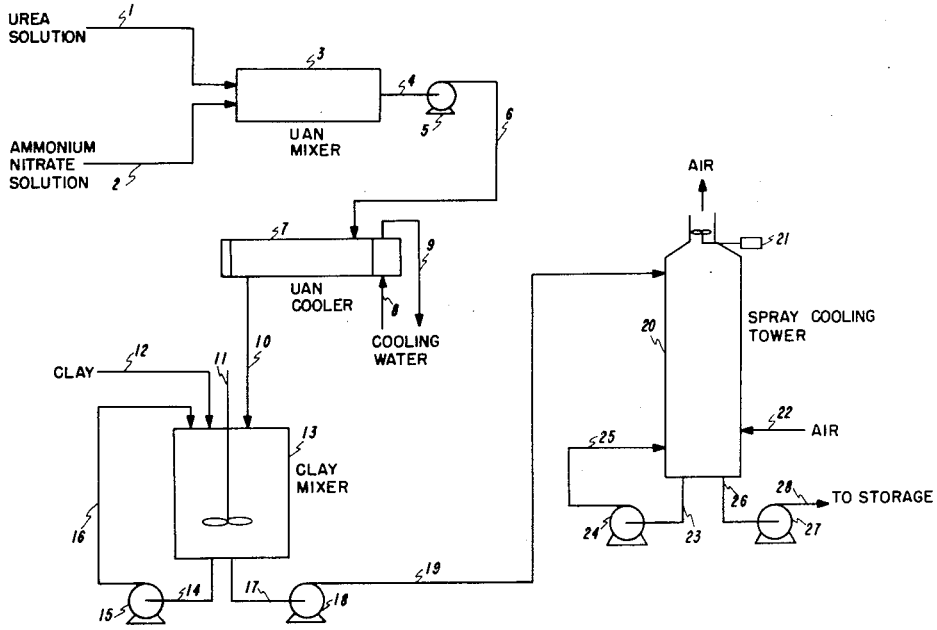

PRODUCTION OF UREA-AMMONIUM NITRATE SUSPENSION FERTILIZER

PRODUCTION OF UREA-AMMONIUM NITRATE SUSPENSION FERTILIZER

EFFECT OF COMPOSITION ON SALT-OUT TEMPERATURES OF UREA-AMMONIUM NITRATE SUSPENSIONS CONTAINING 1.5% CLAY

EFFECT OF COMPOSITION ON SALT-OUT TEMPERATURE OF 36-0-0, 1.5% CLAY GRADE UREA-AMMONIUM NITRATE SUSPENSIONS

EFFECT OF COMPOSITION ON SALT-OUT TEMPERATURES OF 37-0-0 1.5% CLAY GRADE UREA-AMMONIUM NITRATE SUSPENSIONS

EFFECT OF COMPOSITION ON SALT-OUT TEMPERATURES OF 35-0-0, 1.5% CLAY GRADE UREA-AMMONIUM NITRATE SUSPENSIONS